United States Patent [19]

Joice

[11] 4,252,233

[45] Feb. 24, 1981

[54] PLASTIC BAG-WICKETING PIN ADJUSTMENT APPARATUS

[76] Inventor: Richard L. Joice, 20021 Merridy St., Chatsworth, Calif. 91311

[21] Appl. No.: 45,107

[22] Filed: Jun. 4, 1979

[51] Int. Cl.3 .............................................. B65G 17/46

[52] U.S. Cl. .................................................... 198/692

[58] Field of Search ............... 198/692, 693, 472, 422; 248/100; 93/93 HT, 93 R, 93 DP

[56] References Cited

U.S. PATENT DOCUMENTS

| | | | |
|---|---|---|---|
| 2,857,035 | 10/1958 | Gagnon | 198/692 X |
| 3,431,828 | 3/1969 | Crawford et al. | 198/693 X |
| 3,555,977 | 1/1971 | Saumsiegle | 198/692 X |
| 3,625,338 | 12/1971 | Cawley | 198/472 |
| 4,195,540 | 4/1980 | Franks | 198/692 X |

*Primary Examiner*—James F. Coan
*Attorney, Agent, or Firm*—Allan M. Shapiro

[57] ABSTRACT

Wicketing pins on wicketer which receives bags from a plastic bag-making machine are infinitely adjustable so that the tips of the pins can be accurately positioned to properly receive the bags.

23 Claims, 8 Drawing Figures

FIG. 6
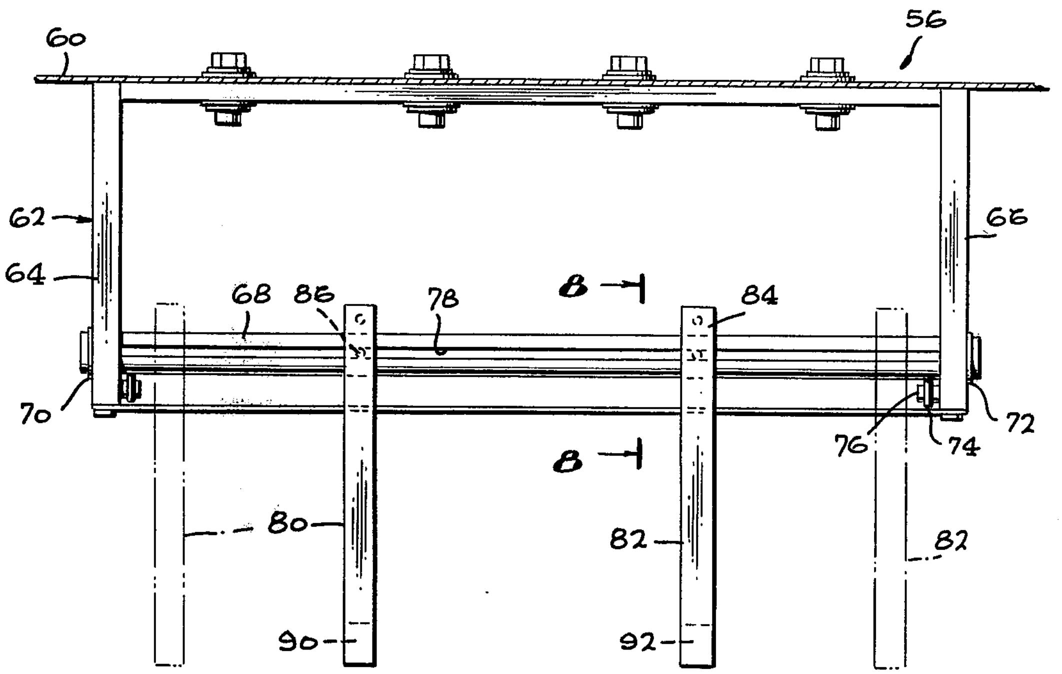
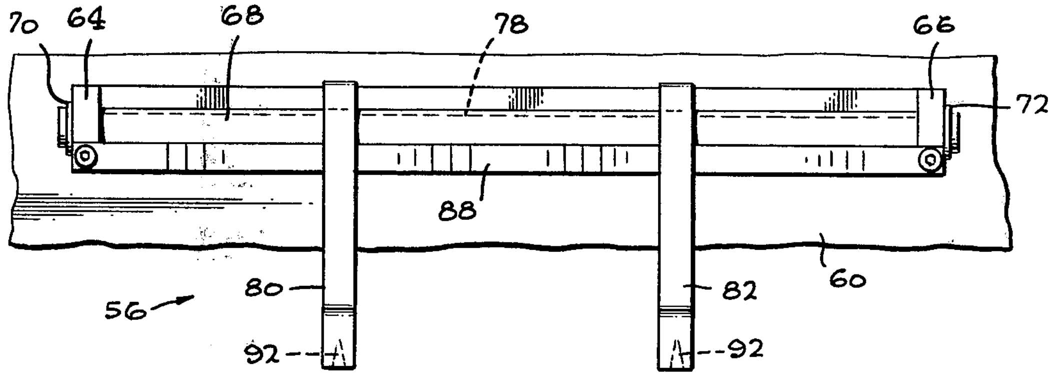
FIG. 7
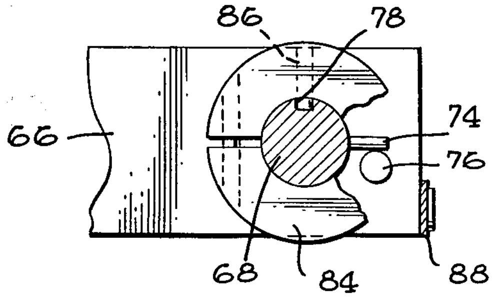
FIG. 8

PLASTIC BAG-WICKETING PIN ADJUSTMENT APPARATUS

BACKGROUND OF THE INVENTION

This invention is directed to a wicketing pin apparatus which receives plastic bags from a bag-making machine, and particularly to adjustability of the wicketing pins and a gage for accurately setting the wicketing pins.

Plastic bag-making machines automatically make plastic bags at a considerable rate, and the output flow of plastic bags from such a machine must be properly managed. One of the convenient ways of managing the bags is by wicketing. In this system, a pair of holes is punched in the bags (usually along the open edge thereof) and, as the bags are delivered, they are delivered over a pair of wicketing pins. The points of the pins are supposed to be properly positioned to accurately receive the bags. The prior art wicketing pins have their bases fixed at a positive position so that the points of the wicketing pins are located purely as a function of the straightness of the wicketing pins. When they are not straight, they cannot properly receive the bags, and there is no way of making an appropriate adjustment.

SUMMARY OF THE INVENTION

In order to aid in the understanding of this invention, it can be stated in essentially summary form that it is directed to a plastic bag-wicketing pin adjustment apparatus within the wicketing pins at the receiving station from a bag-making apparatus are adjustable so that the points of the pin are accurately positionable to receive the plastic bags.

It is thus an object of this invention to provide a wicketing pin adjustment apparatus wherein the wicketing pins at the receiving station are infinitely adjustable so that the points of the pins are accurately and properly positioned for receiving bags to eliminate bag losses from bent pins and slowdowns of production due to improper wicketing. It is another object of this invention to provide infinitely adjustable wicketing pins which are adjustable both in the direction between the pins and in the lateral direction to overcome bent pin deviations in either the interhole direction or in the lateral direction. It is a further object to provide a gage whereby the distance between and the location of the points of the wicketing pins is accurately established, and the pins are locked in position to maintain this pinpoint spacing.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 6 is an enlarged plan view of the wicketing pin gage.

FIG. 7 is a front-elevational view thereof.

FIG. 8 is an enlarged section taken generally along the line 8—8 of FIG. 6, with parts broken away.

DESCRIPTION OF THE PREFERRED EMBODIMENT

Figure 1:
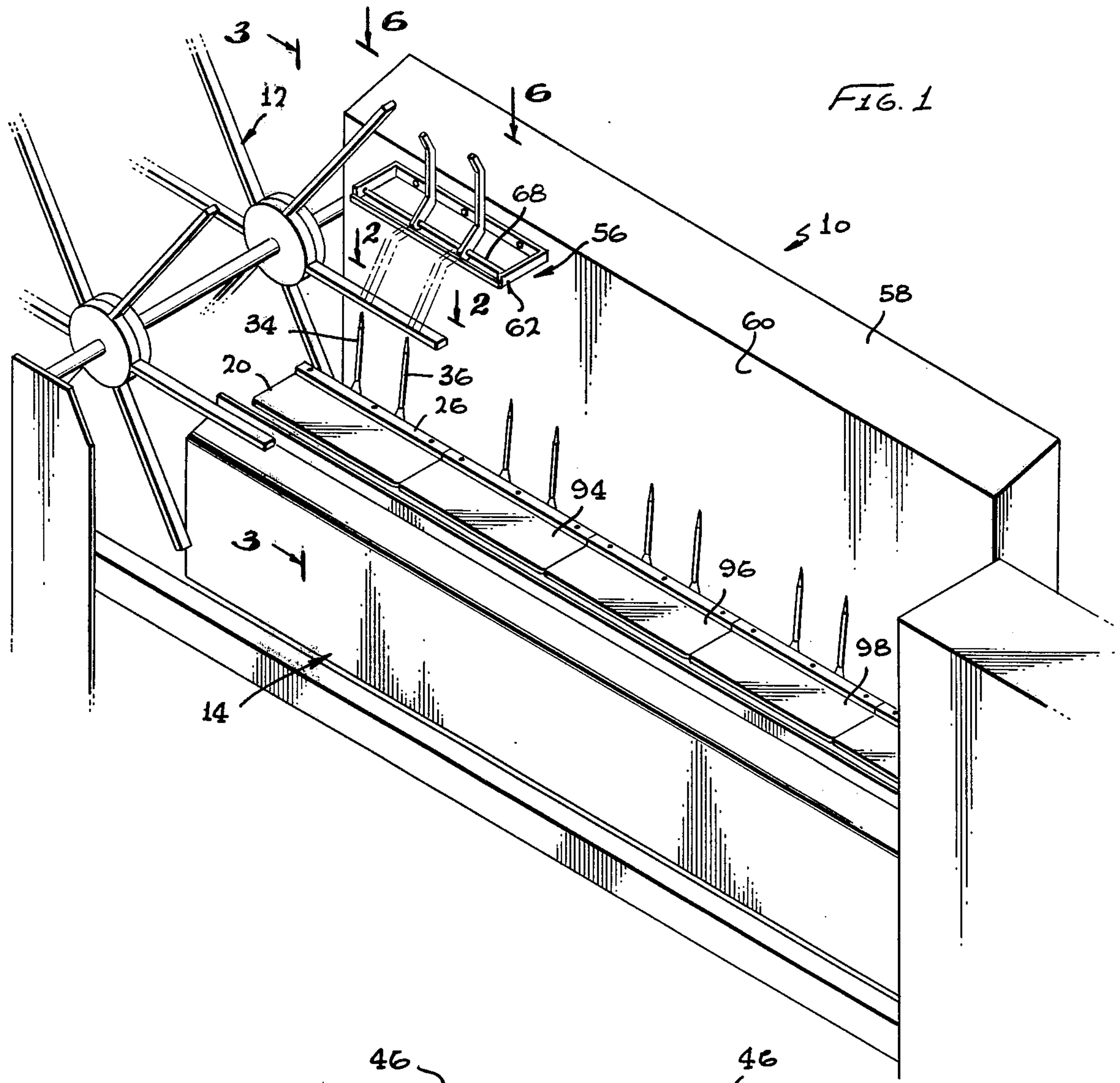
FIG. 1 is an isometric view of a wicketing apparatus including a receiving station where plastic bags are received from a bag-making machine.

Wicketing apparatus 10 is generally indicated in FIG. 1. An automatic bag-making machine is positioned to the left of wicketing apparatus 10 and delivers finished bags having wicketing holes therein to rotary arm bag handler 12. Handler 12 delivers bags to the wicketing pins on wicketing apparatus 10. Wicketing apparatus includes lower housing 14 which contains conveyor substructure of conventional nature. For example, chain 16 (see FIG. 3) extends around a pair of chain sprockets at the opposite ends of lower housing 14. Chain 16 carries chain plates along the length thereof. One of the chain plates is indicated at 18 in FIGS. 2 and 3. The chain plates are secured to the chain, and the chain is driven so that it moves stepwise from station-to-station.

Figure 2:
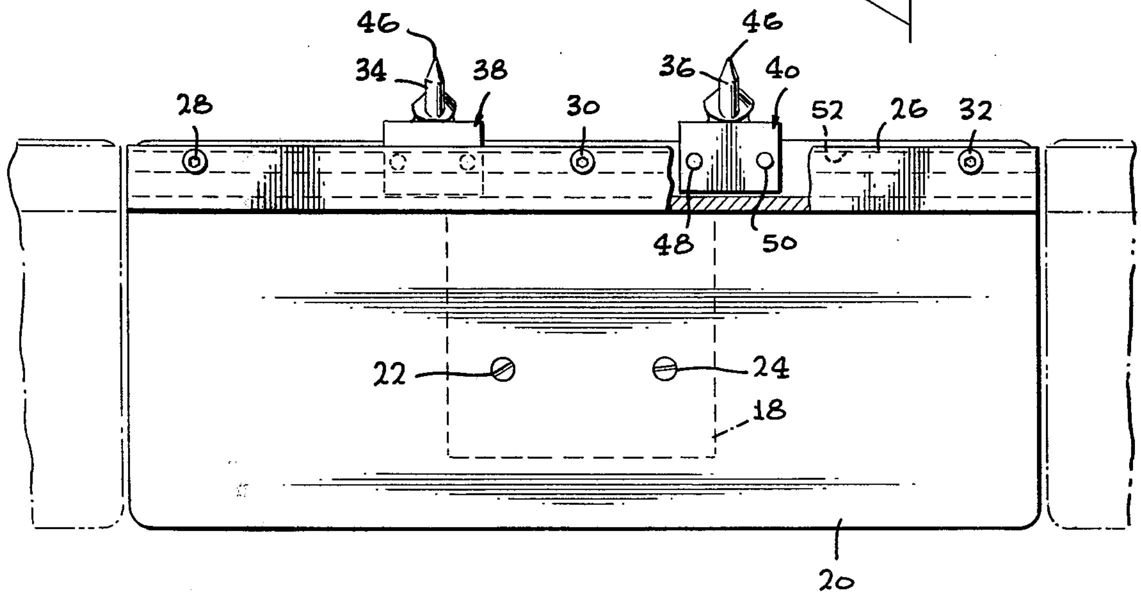
FIG. 2 is an enlarged plan view of the bag-receiving station of the wicketer.

Wicketing plate 20 is bolted down to chain plate 18 and is located at the first station (or receiving station) along the chain. Several machine screws, such as machine screws 22 and 24, (see FIG. 2) engage through wicketing plates 20 into chain plate 18 to removably secure the wicketing plate in place. Several other machine screws may be used, and if so, would be positioned to be hidden below clamp bar 26, as it is seen in FIG. 2. Wicketing plate 20 also has machine screw holes along the upper edge thereof to receive clamp screws 28, 30 and 32 which are engaged on the top of clamp bar 26, extend therethrough, and are threadedly engaged in wicketing plate 20 so that tightening of the clamp screws will pull down clamp bar 26.

Figures 3, 4, 5:
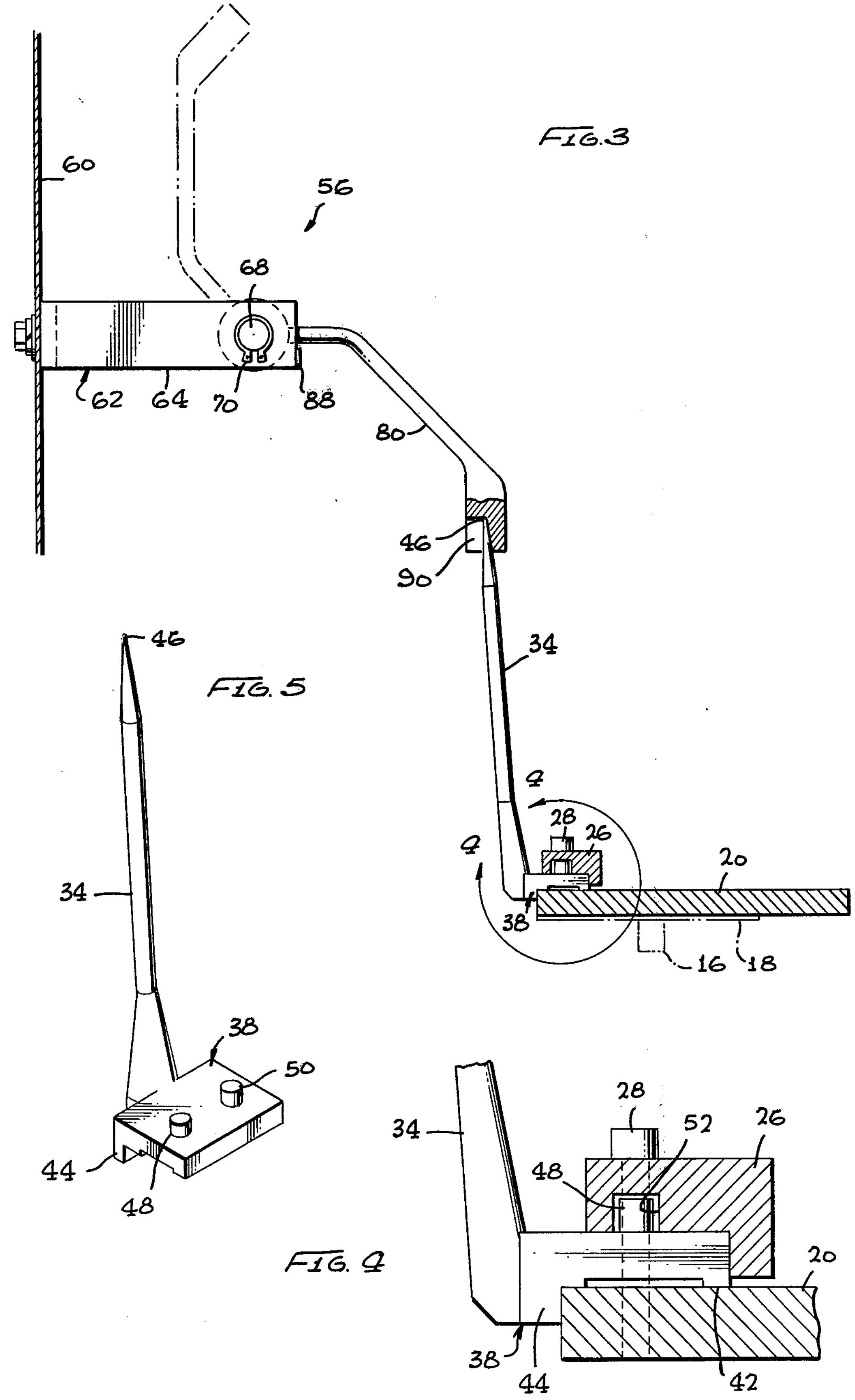
FIG. 3 is an elevational view, with parts broken away and parts taken in section, of the wickets at the receiving station, together with the mechanism for gaging wicketer point position.
FIG. 4 is an enlarged section of the base of one of the wicketing pins, showing a detail of the portion 4—4 of FIG. 3.
FIG. 5 is an enlarged view of a wicketing pin, as compared with FIG. 3.

Wicketing pins 34 and 36 are respectively mounted on bases 38 and 40. Pin 34 is shown in more detail in FIGS. 3, 4 and 5. Base 38 has base surface 42, which engages on the top of wicketing plate 20 and has shoulder 44, which engages against the back edge of plate 20. Wicketing pin 34 extends upward from base 38 at a slight angle to the rear, as seen in FIG. 3, and terminates in round-tipped cone 46, which serves as the point of wicketing pin 34.

The structure thus described thus permits the wicketing pins 34 and 36 to be longitudinally moved along the top back of wicketing plate 20 and to be clamped in place by clamp bar 26. In order to prevent the wicketing pins from sliding out under the back of the clamp bar during the adjustment operation, pin keys 48 and 50 extend upward from the top of base 38. The pin keys engage in key slot 52 formed longitudinally along the length of clamp bar 28. This structure partially restrains the wicketing pins to movement generally along the length of clamp bar 26. However, pin keys 48 and 50 are smaller in diameter than the width of key slot 52 and, thus, a small amount of lateral motion at right angles to the length of key slot 52 is permitted.

When wicketing plate 20 is in the first station, the receiving position from rotary arm bag handler 12, the wicketing pins must be located in the precise position to receive the bags as they come over on the rotary arms, a position which is precisely determined by the bag-making machine and the coordination between the bag-making machine and rotary arm bag handler 12. In order to correctly receive these bags, wicketing pins 34 and 36 are precisely positioned by loosening of clamp bar 26, moving the wicketing pins into precise position, and locking them in place by clamping down clamp bar 26.

The proper position of the points 46 and 54, see FIG. 2, of the two wicketing pins is accurately established by gaging assembly 56, see FIGS. 1, 3, 6 and 7. As is seen in FIG. 1, upper housing 58 extends upward behind lower housing 14. Upper housing 58 contains the control equipment for controlling the advance of the conveyor carrying wicketing plate 20. Front panel 60, see FIGS. 1, 3, 6 and 7, serves as a support for bracket 62 of gaging assembly 56. Bracket 62 is bolted against front surface 16 and has two forward extending arms 64 and 66. Arms 64 and 66 carry shaft 68 therethrough. Shaft 68 is rotatable in arms 64 and 66 and carries snap rings 70 and 72 outside the arms to accurately longitudinally fix the shaft. Taper pin 74, see FIGS. 6 and 8, is positioned in shaft 68 adjacent arm 66. Taper pin 74 engages against stop pin 76 when shaft 58 is rotated to the full-forward position.

As is seen in FIGS. 6, 7 and 8, shaft 58 has keyway groove 78 along the length thereof. Gage arms 80 and 82 have hubs, such as hub 84 for gage arm 82, on which the gage arms are mounted. Keyscrew 86 is engaged in a threaded hole in hub 84, and its dog point engages in keyway 78. When keyscrew 86 is loose, the hubs and their gage arms can move along shaft 68 without rotating thereon because the dog points engage in keyway 78. When keyscrews 86 are tightened, they fix the longitudinal position of gage arms 80 and 82 along the length of shaft 68.

Scale 88, see FIGS. 3, 6, 7 and 8, is fastened on the front of arms 64 and 66 and extends therebetween. Scale 88 is positioned so that, when arms 80 and 82 are in their lower position (see the full line position in FIG. 3), the arms 80 and 82 can be accurately axially positioned along their shaft 68. When they are so positioned, then the keyscrews 86 are tightened so that the gage arms are locked at the proper axial position. However, they can be swung from the lower, active position shown in full line in FIG. 3 to the upper, dashed line position.

The lower end of each of the gage arms 80 and 82 has a gage socket therein. Gage socket 90 is shown in FIG. 3, while gage socket 92 is shown in dotted lines in FIGS. 6 and 7. Each of the gage sockets is conical of such size and shape to fit the upper point of the wicketing pins. FIG. 3 shows the conical point 46 of wicketing pin 34 in gage socket 90. With the gaging arms in the lower position, the wicketing pinpoints are located within the gage sockets so that the points 46 and 54 are accurately located. Thereupon, screws 28, 30 and 32 are tightened down to tighten clamp bar 26 onto the bases of the wicketing pins to hold the wicketing pins in position. It must be noted that, in addition to longitudinal adjustment along the length of the direction of conveyor motion, the axis of shaft 68 and the length of key slot 52, the points of the wicketing pins are adjustable in a direction transverse or at right angles to the longitudinal direction in a plane parallel to the top of wicketing plate 20. In this way, accurate adjustment of the points 46 and 54 of the wicketing pins in both the longitudinal and transverse directions is acheived. Clamping of the clamp bar 26 then holds them in place. Gage sockets 90 and 92 are slotted open at the back so that the gage arms 80 and 82 may be raised to the out-of-the-way dotted line position of FIG. 3.

FIG. 1 illustrates that there is a plurality of wicketing plates along the length of the conveyor. Wicketing plates 94, 96 and 98 are also shown. In addition, there are wicketing plates around the ends and along the inactive, lower length of the conveyor. Before the wicketing apparatus 10 is put in service, the wicketing pins on each of these wicketing plates are accurately placed in their proper location, as described with respect to the wicketing pins in plate 20. To accomplish this, the gage arms are placed in the raised, inactive position in FIG. 1, and the conveyor is indexed so that each wicketing plate successively comes into the receiving position at which the wicketing plate is shown. When each wicketing plate is in that position, the conveyor is stopped, the gaging arms are brought down, and the wicketing pins are adjusted. This is repeated for each of the wicketing plates so that all of the wicketing pins have their points properly and accurately adjusted with great accuracy and in a short time.

Thereupon, wicketing apparatus 10 is ready for service. As the bag-making machine is operated, rotary arm bag handler 12 operates to position a predetermined number of bags on the wicketing pins 34 and 36. When there is a sufficient number thereon, the wicketing apparatus conveyor is advanced one position so that a new plate with its wicketing pins in in the first station, receiving position. The previously loaded wicketing pins are holding their bags in place so that they can be lifted off by wickets, which are brought upward through the wicket holes in the bags and brought upward behind the previously described wicketing pins. In this way, the bags are transferred off of the wicketing pins onto wickets for storage or to be held in readiness for bag-filling.

This invention has been described in its best mode, and it is clear that it is susceptible to numerous modifications and embodiments within the ability of those skilled in the art and without the exercise of the inventive faculty. Accordingly, the scope of this invention is defined by the scope of the following claims.

What is claimed is:

1. A bag-wicketing apparatus comprising:

a wicketing plate onto which bags are stacked as they are wicketed, said plate having a top surface and an edge;

first and second wicketing pins, each of said wicketing pins having a base supported on the top surface of said plate;

means interconnecting each of said wicketing bases and said wicketing plate for permitting movement of said wicketing pins toward and away from each other and for permitting limited motion of said wicketing pin bases on the surface of said wicketing plate in a direction transverse to the direction between said pins; and a clamp bar extending across said bases of said wicketing pins for clamping said bases against the top surface of said plate to clamp said wicketing pins into a selected position so that said wicketing pins can be moved under said clamp bar to the selected position and thence clamped.

2. The bag-wicketing apparatus of claim 1 wherein said wicketing pin bases and said clamp have interengaging key and key slots.

3. The apparatus of claim 2 wherein said slot is in said clamp bar and said key is upwardly directed on said base.

4. A bag-wicketing apparatus comprising:

a wicketing plate onto which bags are stacked as they are wicketed, said plate having a top surface and an edge;

first and second wicketing pins, each of said wicketing pins having a base supported on the top surface of said plate;

a clamp bar extending across said bases of said wicketing pins for clamping said bases against the top surface of said plate, said wicketing pin bases and said clamp bar having interengaging key and key slots, said key being narrower than said slot so that said bases can be adjusted transversely as well as longitudinally with respect to said slot to clamp said wicketing pins into a selected position so that said wicketing pins can be moved under said clamp bar to the selected position and thence clamped.

5. The bag-wicketing apparatus of claim 4 wherein said key comprises at least one pin engaging in said slot.

6. A bag-wicketing apparatus comprising:

a wicketing plate onto which bags are stacked as they are wicketed, said plate having a top surface and an edge;

first and second wicketing pins, each of said wicketing pins having a base supported on the top surface of said plate;

a clamp bar extending across said bases of said wicketing pins for clamping said bases against the top surface of said plate, a key and a key slot between said wicketing pin bases and said clamp, said key comprising two pins engaging in said slot, said pins being narrower than said slot so that said base can be adjusted transversely as well as longitudinally with respect to said slot to clamp said wicketing pins into a selected position so that said wicketing pins can be moved under clamp bar to the selected position and thence clamped.

7. The apparatus of claim 6 wherein said slot is in said clamp bar and said key is upwardly directed on said base.

8. A bag-wicketing apparatus comprising:

a wicketing plate onto which bags are stacked as they are wicketed, said plate having a top surface;

first and second wicketing pins, each of said wicketing pins having a base supported on the top surface of said plate;

a clamp bar extending across said bases of said wicketing pins for clamping said bases across the top surface of said plate, a slot in said clamp bar and an upwardly directed pin on said base engaging in said slot.

9. The bag-wicketing apparatus of claim 8 wherein said base has a shoulder thereon extending below said top surface of said wicketing plate and engaging along the edge of said wicketing plate to aid in guiding said wicketing pin along the length of said key slot.

10. A bag-wicketing apparatus comprising:

a plurality of wicketing plates positioned along and supported on a conveyor chain, said conveyor chain being movable to position any one of said wicketing plates into a receiving station, each said wicketing plate having a top surface for the support of polymer film bags;

each of said wicketing plates having first and second wicketing pins upstanding therefrom, each of said wicketing pins having its own separate base supported on the surface of said wicketing plate so that each said wicketing pin can be adjusted toward and away from the other wicketing pin on each said wicketing plate, and in a direction transverse thereto;

a clamp bar engaged over both said bases of said wicketing pins on each said wicketing plate for clamping said bases against said wicketing plate for clamping said wicketing pins in a selected position; and gaging means on said wicketing apparatus, said gaging means having gaging surface thereon for indicating the desired position of said wicketing pins so that said wicketing pins can be clamped into the preselected position by said clamp bar.

11. A bag-wicketing apparatus comprising:

a plurality of wicketing plates positioned along and supported on a conveyor chain, said conveyor chain being movable to position any one of said wicketing plates into a receiving station, each said wicketing plate having a top surface for the support of polymer film bags;

each of said wicketing plates having first and second wicketing pins upstanding therefrom, each of said wicketing pins having a base supported on the surface of its wicketing plate;

a clamp bar engaged over both said bases of said wicketing pins on each said wicketing plate for clamping said bases against said wicketing plate for clamping said wicketing pins in a selected position; and a pair of gage arms on said wicketing apparatus, said gage arms each having a gaging surface thereon for indicating the desired position of said wicketing pins so that said wicketing pins can be clamped into the selected position by said clamp bar, said gaging arms being movably mounted on said wicketing apparatus so that they can be moved away from gaging position so that said wicketing pins can receive bags for wicketing thereon.

12. The bag-wicketing apparatus of claim 11 wherein said gage arms are adjustable mounted so that the position for said wicketing pins can be preselected by adjusting the position of said gage arms.

13. The bag-wicketing apparatus of claim 12 wherein said gage arms are mounted on a shaft and can be moved along the length of said shaft for adjusting the position between said gaging surfaces on said gage arms and can be locked on said shaft for maintaining the preselected gaging surface position, said shaft being rotatable so that said gage arm can be swung out of gaging position away from said wicketing pins.

14. The bag-wicketing apparatus of claim 13 wherein each of said wicketing pins has a substantially conical point and said gaging surfaces each comprise a conical recess for receiving said points, said conical recess having an open side for swinging said gaging arms away from said wicketing pins.

15. A bag-wicketing apparatus comprising:

a plurality of wicketing plates positioned along and supported on a conveyor chain, each said wicketing plate having a top surface for the support of polymer film bags;

each of said wicketing plates having first and second wicketing pins upstanding therefrom, each of said wicketing pins having its own separate base supported on the surface of said wicketing plate;

a clamp bar engaged over both said bases of said wicketing pins on said wicketing plate for clamping said bases against said wicketing plate for clamping said wicketing pins in a selected position; and a pair of gage arms on said wicketing apparauts, said gage arms each having a gage surface thereon for indicating the desired position of said wicketing pins, said gage arms being adjustably mounted so that the position of said wicketing pins can be preselected by adjusting the position of said gage arms, so that said wicketing pins can be clamped into the preselected position by said clamp bar; and control means connected to said conveyor chain for driving and controlling said conveyor chain so that each of said wicketing plates can be indexed to the receiving position and the wicketing pins thereon adjusted to the same preselected position so that each set of wicketing pins can receive polymer film bags for wicketing.

16. A bag-wicketing apparatus comprising:

a plurality of wicketing plates positioned along and supported on a conveyor chain, said conveyor chain being movable to position any one of said wicketing plates into a receiving station, each said wicketing plate having a top surface for the support of polymer film bags;

each of said wicketing plates having first and second wicketing pins upstanding therefrom, each of said wicketing pins having its own separate base supported on the surface of said wicketing plate;

a clamp bar engaged over both said bases of said wicketing pins for clamping said bases against said wicketing plate for clamping said wicketing pins in a selected position said wicketing pin bases and said clamp having interengaging key and key slots; and a pair of gaging arms on said wicketing apparatus, said gage arms each having a gaging surface thereon for indicating the desired position of said wicketing pins, said gage arms being adjustably mounted so that the position of said wicketing pins can be preselected by adjusting the position of said gage arms so that said wicketing pins can be clamped into the preselected position by said clamp bar, said gage arms being movably mounted on said wicketing apparatus so that they can be moved away from gaging position so that said wicketing pins can receive bags for wicketing thereon.

17. The bag-wicketing apparatus of claim 16 wherein said key is narrower than said slot so that said base can be adjusted transversely as well as longitudinally with respect to said slot.

18. The bag-wicketing apparatus of claim 17 wherein said key comprises at least one pin engaging in said slot.

19. The bag-wicketing apparatus of claim 18 wherein said key comprises two pins engaging in said slot.

20. The apparatus of claim 19 wherein said slot is in said clamp bar and said key is upwardly directed on said base.

21. A bag-wicketing apparatus comprising:

a plurality of wicketing plates positioned along and supported on a conveyor chain, said conveyor chain being movable to position any one of said wicketing plates into a receiving station, each said wicketing plate having a top surface for the support of polymer film bags;

each of said wicketing plates having first and second wicketing pins upstanding therefrom, each of said wicketing pins having its own separate base supported on the surface of said wicketing plate;

a clamp bar engaged over both said bases of said wicketing pins on each wicketing plate for clamping said bases against said wicketing plate for clamping said wicketing pins in a selected position;

a slot in said clamp bar and a key upwardly directed on said base so that said clamp bar is interengaged with each said wicketing pin base; and a pair of gage arms on said wicketing apparatus, said gage arms each having a gaging surface thereon for indicating the desired position of said wicketing pin, said gage arms being adjustably mounted so that the position for said wicketing pins can be preselected by adjusting the position of said gage arms so that said wicketing pins can be clamped into a preselected position by said clamp bar.

22. The bag-wicketing apparatus of claim 21 wherein said key comprises at least one pin engaging in said slot.

23. The bag-wicketing apparatus of claim 22 wherein said base has a shoulder thereon extending below said top surface of said wicketing plate and engaging along the edge of said wicketing plate to aid in guiding said wicketing pin along the length of said key slot.

* * * * *